June 16, 1953 R. B. ALBRIGHT 2,642,528

ANTENNA FOR TELEVISION RECEIVERS

Filed June 17, 1949 3 Sheets-Sheet 1

INVENTOR.
ROBERT B. ALBRIGHT
BY
Brown, Denk & Synnestvedt
AGENTS

June 16, 1953 R. B. ALBRIGHT 2,642,528

ANTENNA FOR TELEVISION RECEIVERS

Filed June 17, 1949 3 Sheets-Sheet 2

INVENTOR.
ROBERT B. ALBRIGHT
BY
Brown, Denk & Synnestvedt
AGENTS

INVENTOR.
ROBERT B. ALBRIGHT
BY
Brown, Denk & Synnestvedt
AGENTS

Patented June 16, 1953 2,642,528

UNITED STATES PATENT OFFICE 2,642,528

ANTENNA FOR TELEVISION RECEIVERS

Robert B. Albright, Philadelphia, Pa., assignor to Philco Corporation, Philadelphia, Pa., a corporation of Pennsylvania Application June 17, 1949, Serial No. 99,621

2 Claims. (Cl. 250—33)

The invention herein described and claimed relates to a new antenna system for the reception of very high frequency signals, particularly television signals.

The new antenna system, comprising essentially a wide-band antenna and a tuner circuit, is tunable selectively to each of the channels currently assigned to television broadcasting.

While the physical form of the antenna may vary considerably, I prefer that it comprise a dipole, each arm of which is roughly triangular in shape.

In the preferred embodiment, the physical dimensions of the system, including both the dipole and the tuner, are sufficiently small to permit the entire system to be contained within the cabinet of a television receiver. This feature is, of course, highly advantageous from a commercial point of view.

I am aware of no prior-art antenna system, containable wholly within the cabinet of the television receiver, which has operating characteristics as satisfactory as those of the system of the present invention. Prior to my invention, to obtain results as good as those provided by my new antenna system, the user of a television receiver had either to install an expensive outdoor antenna, or to install a large, unsightly indoor dipole located outside of the receiver cabinet, usually on the top thereof, and to change the physical length of the dipole for each individual station selected.

At the present state of the art, the results obtainable from a properly-designed outdoor antenna are, almost without exception, superior to those obtained from an indoor type of television antenna. However, an outdoor antenna has several important disadvantages. In the first place, its cost, including material and installation, is a disproportionately high fraction of the cost of the complete television-receiver installation. Secondly, an outdoor antenna is unsightly, detracting measurably from the appearance of the home or apartment upon which it is erected. Thirdly, an outdoor antenna is not readily adjusted. For example, an antenna installed to give optimum reception of the transmitting stations in operation at the time of the antenna installation may not be properly oriented to provide satisfactory reception of a new station transmitting from a different location, thus putting the owner to the expense of either changing the bearing of the previously installed antenna or of adding a second antenna. Other disadvantages of an outdoor antenna include the possibility of damage by lightning, wind and freezing rain.

Because of the above-mentioned faults, those skilled in the art have expended a very substantial amount of time in an effort to develop an indoor antenna having satisfactory operating characteristics and an attractive appearance. As a result, a large variety of indoor antennas have been built, but no prior-art antenna which can be installed within the receiver cabinet has operating characteristics as satisfactory as those produced by the antenna system of the present invention.

Most of the prior-art indoor antennas which are mounted on top of the cabinet are awkward and unsightly. This is an inevitable consequence of the fact that, for optimum reception of signals in the presently-assigned television Channel No. 2 (54–60 mc.) a properly designed conventional half-wave dipole would have to have an overall length of 8.6 feet. Manifestly, such structures are unacceptable to most customers.

It is a primary object, then, of this invention to provide, for a television or other wide-band receiver of high-frequency signals, an improved antenna system of sufficiently small physical dimensions to permit its installation within a small cabinet, preferably within the cabinet which houses the receiver.

It is a more specific object of this invention to provide, for a receiver of high-frequency signals, an antenna system containable within the cabinet of the receiver and tunable electrically by the operator to any one of a plurality of channels or stations.

It is a feature of a preferred embodiment of the present invention that the antenna system is tuned by a single, readily adjustable, electrical circuit element.

Described briefly, the antenna system of the present invention, in its preferred embodiment, includes a wide-band dipole the arms of which are comprised of truncated-triangular sheets of conductive material, the outer portions of which are bent at right angles to the inner portions, thus to form capacity hats. The antenna is coupled to a parallel-resonant tuner circuit comprising a variable capacitor in shunt with a fixed inductance. The terminals of the shunt combination are connected to the terminals of the dipole. By varying the capacitor, the antenna system may be selectively tuned to any one of the twelve channels presently assigned to commercial television broadcasting. The fixed shunt inductance, in addition to being an element in the parallel-resonant tuner circuit, also functions to match effectively the impedance of the antenna system to that of the transmission line which connects the antenna system to the input circuits of the television receiver. In some instances, including the preferred embodiment, additional series inductance is desirably connected between the dipole and the parallel-resonant tuner circuit the function of which is to increase the inductive reactance at the higher frequencies, thus to make the equivalent shunt resistance of the combined dipole and series reactance more nearly uniform over the range of television frequencies.

The above-recited objects, features and advantages of the present invention, and the manner in which the objects are attained, will be best understood from a consideration of the following detailed description and accompanying drawing wherein.

Figure 1:
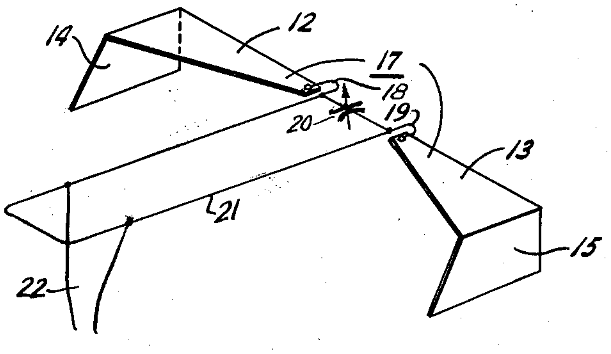
Figure 1 is a perspective representation, partly schematic, of a preferred form of antenna system in accordance with the present invention.

Referring now to Figure 1 there is shown an antenna system in accordance with my invention comprising briefly, a wide-band dipole 17, a pair of inductive elements 18—19 connected in series with the dipole, and a shunt resonant circuit comprised of variable capacitor 20 and inductance 21.

The wide-band dipole 17 of Figure 1 comprises a pair of truncated-triangular sheets of conductive material having inner portions 12—13 occupying a common plane and end portions 14—15 turned down substantially at right angles from the common plane. The effect of the turned-down portions is to increase the distributed capacitance between the arms of the dipole. The dipole material may be copper, or aluminum, or any other conducting material. I prefer, however, to employ aluminum sheet foil having a thickness of about five-thousandths of an inch.

While other wide-band dipoles may be used, as indicated hereinafter, I prefer to employ a dipole whose sections have the truncated-triangular or trapezoidal form shown in Figure 1. This antenna is, in effect, a form of bi-conical dipole, the inner portions 12—13 being cross-sectional segments of truncated right-angle cones.

The advantages of employing a dipole of the particular form mentioned above are two-fold. First, I have found that an antenna of this form, having dimensions sufficiently small to be contained within the cabinet of the receiver, possesses the electrical characteristics desired. Secondly, the dipole may be economically produced without waste of material. This latter fact is demonstrated in Figure 2 where a rectangular sheet of aluminum foil is shown. By cutting the rectangular sheet along the solid line 25 and then bending at right angles along the dotted lines 26 and 27, the dipole shown in Figure 1 may be produced. In commercial practice, for the reception of signals in the presently-allocated twelve television channels, I employ a rectangular sheet of aluminum foil 13 inches long and 8 inches wide. The cutting line 25 extends from a point on the left-hand edge one inch up from the bottom to a point on the right-hand edge one inch down from the top. The folding lines 26 and 27 are 4 inches in from the 7-inch edges.

Returning now to Figure 1, the antenna system there shown includes, in addition to the wide-band dipole described above, the series-inductance elements 18—19, and the parallel-resonant tuner circuit comprising the shunt variable capacitor 20 and the shunt fixed inductance 21. The variable capacitor 20 preferably constitutes the single adjustable tuning element of the antenna system. The fixed inductance 21, in addition to being an element in the parallel-resonant tuner circuit, functions as an impedance-matching device, effectively matching the impedance of the antenna system with that of the transmission line 22. The impedance match between the antenna system and the transmission line 22 is controlled by the selection of the tapping points on the inductor 21.

The physical structure of the tuner 20—21, of the series-inductance elements 18—19, and of the mounting means therefor, according to a preferred embodiment, are shown in detail in Figures 3 and 4 and will be described hereinafter.

Figures 3, 4, 5:
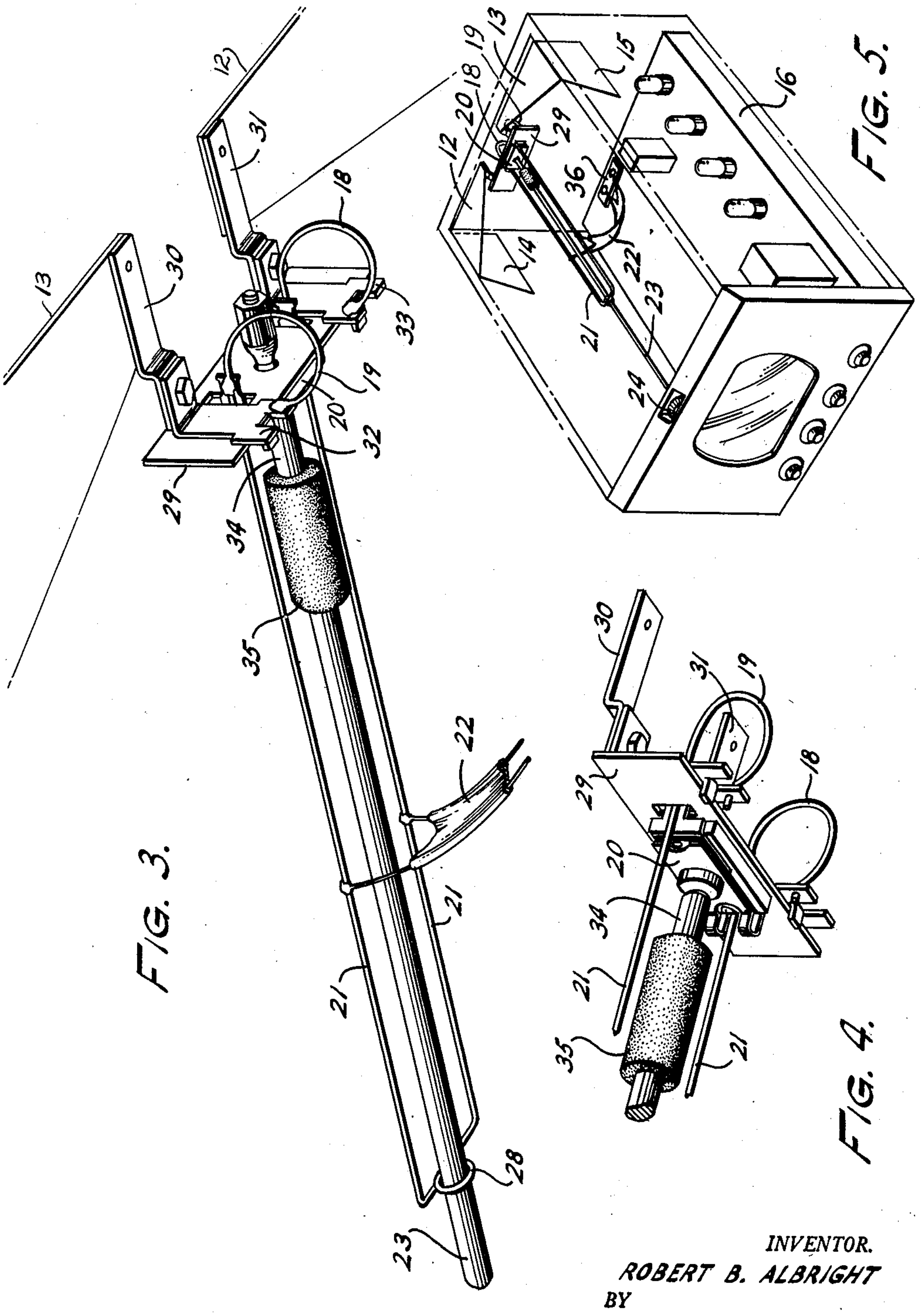
Figures 3 and 4 are perspective views showing the mechanical construction of a preferred form of antenna tuner.
Figure 5 is a perspective view of a television receiver embodying my novel antenna system, the receiver cabinet appearing, in part, in phantom representation.

The preferred manner of mounting the entire antenna system within the cabinet of the television receiver is illustrated in Figure 5. The inner portions 12—13 of the foil dipole are secured to the under surface of the top of the cabinet adjacent the back wall or panel thereof. The turned-down portions 14—15 are secured to the inner surfaces of the sides of the cabinet, as shown. It should be understood, however, that the primary purpose in turning down portions 14—15 is not merely to accommodate the foil dipole to the space limitations of a small cabinet structure. The primary purpose is to obtain the increase in capacity which results as a consequence of the outer portions of the foil dipole being turned down. Stated generally, the turned-down form illustrated in Figure 5 is desirable from an electrical-characteristic point of view and should be retained even though space factors make possible the use of a dipole having fully extended extremities.

The remaining elements of the antenna system shown in Figure 5, comprising the series-inductance elements 18—19 (barely visible) and the parallel-resonant tuner elements 20—21, occupy a central position adjacent the undersurface of the cabinet top. Capacitor 20 is adjustable by means of a shaft 23 which extends forwardly to the front of the cabinet, terminating in a control knob 24 located in a recess provided in the top of the cabinet at the front. Shaft 23 is preferably constructed of an insulating material, hard rubber for example. Mechanical arrangements other than that shown in Figure 5 may, of course, be employed. The arrangement illustrated in Figure 5 is, however, preferred. In the position shown, the cabinet-contained foil dipole is as far removed as possible from the chassis 16 of the television receiver. This is, of course, desirable. The transmission line 22 is connected across the shunt inductor 21 and interconnects the antenna system and receiver. In Figure 5, transmission line 22 is shown terminating at terminal strip 36 on the chassis 16.

Returning now to Figures 3 and 4, these figures show the structural details of the antenna system (other than the dipole 17 itself) as viewed from below looking up toward the undersurface of the top of the cabinet, assuming the structure to be mounted within a cabinet in the manner shown in Figure 5.

As shown in Figure 3, the series-inductance elements 18—18 and the shunt-inductance element 21 may be formed from a single length of No. 16 tinned copper wire bent into a long hairpin loop, the ends of which are turned back to form two small C-shaped loops, each having a diameter of about three-quarters of an inch. These C-shaped loops comprise the series inductances 18—19. The remaining portion of the wire, of general hairpin form, having a loop length of about 7.5 inches, comprises the shunt inductance 21. At the U-turn of the hairpin loop, the wire, for reasons of support, is looped around the insulated shaft 23 as indicated at 28. The loop 28 does not, however, comprise part of the shunt inductance 21, being short circuited upon itself, as by a drop of solder.

As may be seen in Figures 3 and 4, the variable capacitor 20 may comprise a conventional trimmer capacitor mounted upon a Bakelite panel 29 and connected across the hairpin loop 21 at the point where the straight portions of the hairpin terminate and the turned-back portions begin. The Bakelite panel is secured to the undersurface of the cabinet top by suitable bracket members 30—31—32—33.

In addition to serving as the physical supporting means, the bracket members 30—31—32—33 also serve to connect conductively the series inductance and tuner elements to the foil dipole. The bracket members are therefore made of suitable conductive material such as cadmium-plated steel. The inner ends or terminals of the foil dipole are in contact with the ends of the bracket members 30—31 as may be seen in Figure 5. The ends of the C-shaped loops 18—19 are secured, as by soldering, to the lower ends of the L-shaped bracket members 32—33.

The insulated shaft 23, which extends from the control knob 24 at the front of the cabinet to the trimmer capacitor 20, is connected to the metal shaft 34 of the capacitor 20 through a suitable flexible-coupling device 35.

The transmission line 22 is of the parallel or twin-lead type and may have a length of about two feet. It is connected across the hairpin loop comprising the shunt inductance 21 at a point about three inches from the U-turn end of the hairpin. The position of this tap point will vary in different designs, of course, and depends partly upon the effective impedance of the dipole, the impedance of the twin-lead line, and the input impedance of the receiver.

In one particular embodiment which has been developed for large-scale production, the series-inductance elements 18—19 each have an inductance of about 0.05 microhenry, while the shunt inductance element 21 has an inductance of the order of one microhenry. The trimmer capacitor has a range extending from about two to thirty micromicrofarads. The transmission line 22 has a characteristic impedance of about 300 ohms.

Figure 6:
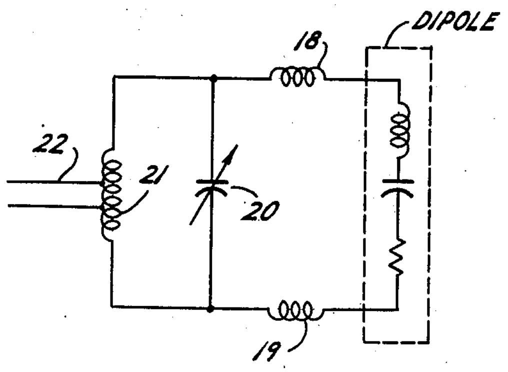
Figure 6 shows schematically the equivalent electrical circuit of the new antenna system.
Figure 7:
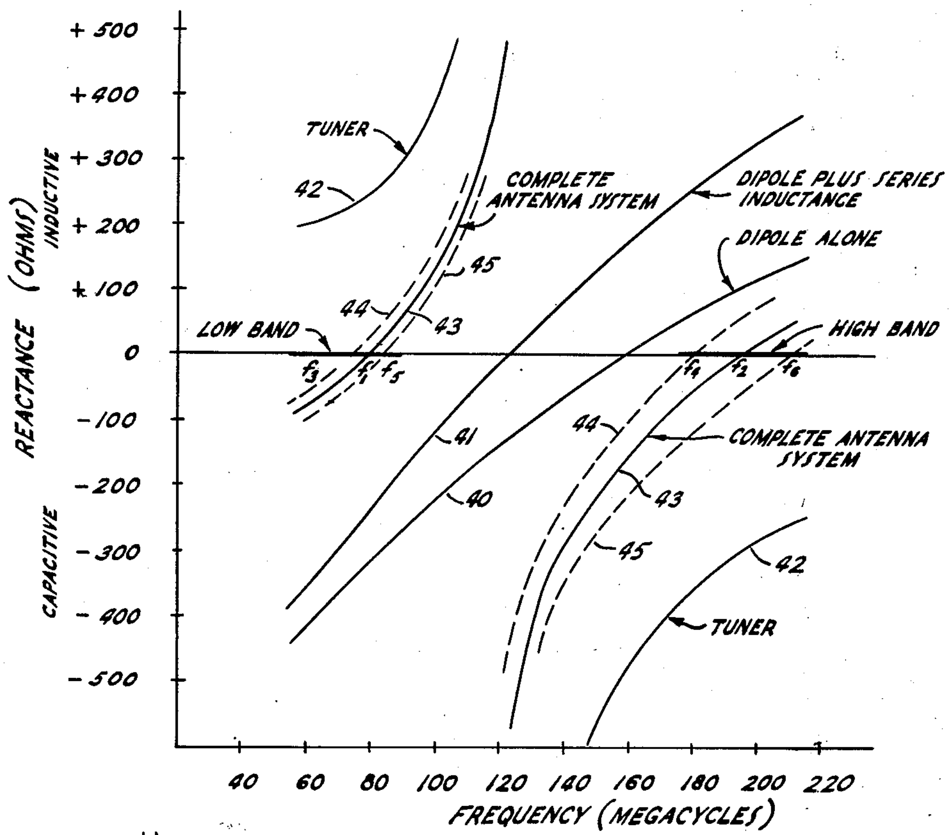
Figures 7 and 8 are graphical representations of certain characteristics of the antenna and tuner which will be helpful in explaining the operation of the new system.
Figure 8:
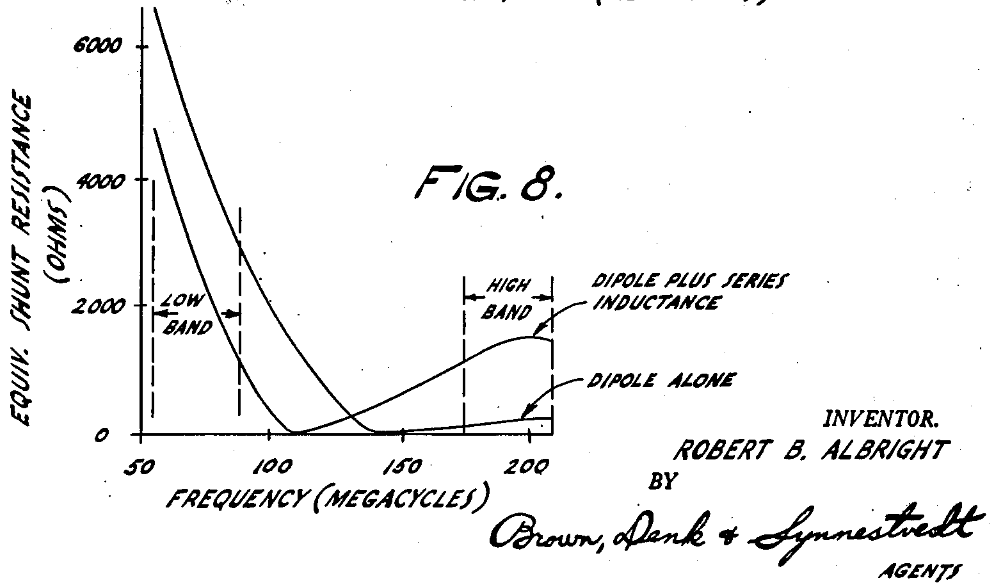

With the assistance of the schematic representation shown in Figure 6 and the graphical representations shown in Figures 7 and 8, I will now discuss the operation of the new antenna system.

In Figure 6, I have shown schematically the equivalent circuit of my novel antenna system. The dipole itself is equivalent to a series circuit comprising inductance, capacitance, and resistance. These components are, of course, not actually lumped as shown in the equivalent circuit of Figure 6 but are distributed non-uniformly throughout the dipole. The inductance is derived largely from those portions of the conductive sheet material located near the terminals of the dipole where the transverse dimension of the sheet foil is small. The capacitance, on the other hand, is derived principally from the turned-down extremities 14—15, where the two surfaces of sheet foil have considerable area, and are opposite and parallel to each other. The resistance, in the equivalent circuit, represents primarily the radiation resistance of the dipole, the ohmic resistance being negligible.

In Figure 7, the curve 40 shows the manner in which the net series reactance of the dipole varies with frequency. The range of frequencies to be received, in the present example, extends from 54 to 88 megacycles and from 174 to 216 megacycles. Channels Nos. 2 through 6 are presently assigned to the 54–88 megacycle band and are sometimes referred to as the low-band television channels. Channels Nos. 7 through 13 are presently assigned to the 174–216 megacycle band and are sometimes referred to as the high-band television channels. The intermediate gap extending from 88 to 174 megacycles is assigned to other services and is of no interest in the present consideration.

The curve 40 of Figure 7 represents the net series reactance characteristic of a wide-band dipole having the particular form and the particular physical dimensions described above with respect to Figures 1 and 2. Observe that the dipole is series resonant at a frequency of about 160 megacycles located intermediate the presently-assigned low-band and high-band television channels. At frequencies lower than the series-resonant frequency, the net series reactance of the dipole is capacitive, having a maximum value of about 450 ohms at 54 megacycles, the low end of the low band. For frequencies higher than the series-resonant frequency, the net series reactance of the antenna is inductive, having a maximum value of about 150 ohms at 216 megacycles, the upper end of the high band.

Although not shown in Figure 7, the radiation resistance of the particular dipole hereinbefore described is very small at the low-band frequencies 554–88 mc.), being of the order of from 20 to 30 ohms. At the high-band frequencies (174–216 mc.), the radiation resistance, though still small, is somewhat larger, ranging from about 40 ohms on Channel No. 7 to about 100 ohms on Channels Nos. 12 and 13.

Because the net series reactance of the particular dipole of Figure 1 is larger, and the radiation resistance smaller, at the low-band frequencies than at the high-band frequencies, the equivalent shunt resistance of the dipole is substantially higher throughout the low band than it is throughout the high band. A convenient formula for computing equivalent shunt resistance is $$R_{eq}=R_a+\frac{X_a^2}{R_a}$$

where—

$R_{eq}$=the equivalent shunt resistance.
$R_a$=the radiation resistance of the antenna.
$X_a$=the reactance of the antenna.

In Figure 8, I have plotted a curve of the equivalent shunt resistance of the particular dipole of Figure 1, computed by the above formula, for the frequencies of the low-band and high-band television channels. It will be seen that on the low-band channels the equivalent shunt resistance varies from about 7000 ohms on Channel No. 2 to about 3000 ohms on Channel No. 6, while on the high-band channels it varies from less than 100 ohms on Channel No. 7 to about 300 ohms on Channels Nos. 10–13. It is the function of the series inductive-reactance elements 18—19 to decrease the equivalent shunt resistance of the dipole at the frequencies of the low-band channels and to increase the equivalent shunt resistance at the frequencies of the high-band channels. This is depicted graphically in Figure 8 wherein the equivalent shunt resistance of the combined dipole and series inductive-reactance elements 18—19 is plotted against frequency. Observe that the equivalent shunt resistance at the low-band and high-band frequencies are now more nearly of the same order of magnitude.

In Figure 7, curve 41 represents the combined reactance of the dipole of Figure 1 and the series inductances 18—19, plotted against frequency. By comparing the reactance-curve 41 of the combined dipole and series inductances with the reactance-curve 40 of the dipole alone, the effect of the series-inductance elements may be clearly seen. Observe that the inductive reactance (at the high-band frequencies) is increased from a maximum value of about 150 ohms to a maximum value of about 380 ohms, while the capacitive reactance (at the low-band frequencies) is descreased from a maximum value of about 450 ohms to a maximum value of about 400 ohms. Note also that the frequency at which the combined dipole and series-inductance elements is series resonant is approximately 120 megacycles, whereas the dipole alone is series resonant at about 160 megacycles.

Consider now the effect of the parallel-resonant tuner circuit comprising the variable shunt capacitor 20 and the fixed shunt inductor 21. Capacitor 20 and inductor 21 are so chosen, with respect to values, that, by adjusting variable capacitor 20 to about the middle of its range, the tuner circuit may be made parallel-resonant at approximately the same frequency as that at which the combined dipole and series-inductance elements in series resonant, about 120 megacycles in the present example.

In Figure 7, curve 42 shows the reactance characteristic of the tuner circuit 20—21 when capacitor 20 is so adjusted that the tuner circuit is parallel-resonant at 120 megacycles. Observe from curve 42 that the reactance of tuner 20—21 is inductive at frequencies lower than, and capacitive at frequencies higher than, the frequency (120 mc.) at which the tuner is parallel-resonant. The curve 43 (which can be obtained by adding, algebraicly, the ordinates of curves 41 and 42, point by point) shows the reactance characteristic of the complete antenna system (comprising the dipole 17, the series inductances 18—19, and the tuner 20—21) when capacitor 20 is so adjusted that the tuner 20—21 is parallel-resonant at the frequency at which the combined dipole and series-inductance elements are series-resonant, in the present example, 120 megacycles. Observe that the system is then resonant at two frequencies, $f_1$ and $f_2$, one of which is in the low band, and the other of which is in the high band. This is an important feature of the invention since, as will appear more clearly hereinafter, it makes it possible to tune the antenna through each of the twelve television channels with a single variable capacitor of conventional design and small physical size.

If capacitor 20 now be adjusted to a larger capacitance value, the reactance of the tuner circuit 20—21 will change, the tuner circuit will be parallel-resonant at a lower frequency, and the reactance characteristic of the complete antenna system will move to the left, as indicated in Figure 7 by the curve 44. The antenna system will then be resonant at the two frequencies, $f_3$ and $f_4$.

If, on the other hand, capacitor 20 be adjusted to a smaller capacitance value, the tuner circuit will be parallel-resonant at a higher frequency, the reactance characteristic of the antenna system will move to the right, as indicated in Figure 7 by the curve 45, and the system will then be resonant at the two frequencies, $f_5$ and $f_6$.

In this manner, by adjusting a single element, namely capacitor 20, I am able to tune the antenna system selectively to each of the frequencies of either the low-band or high-band television channels.

Figure 2:
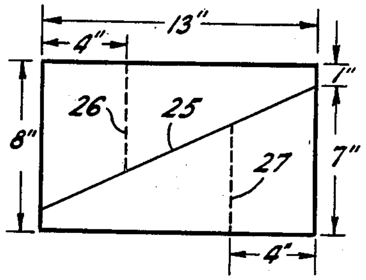
Figure 2 shows how the arms of the dipole of Figure 1 may be made from a rectangular metal sheet or foil without waste of material.

In the antenna system being used commercially, employing a dipole having the form and dimensions previously described in connection with Figures 1 and 2, and a tuner circuit having the constants previously mentioned, when capacitor 20 is so adjusted that the antenna system is resonant to the center frequency of Channel No. 7 (177 mc.) which is at the lower end of the high band, the antenna system is also resonant to a frequency in the vicinity of low-band Channel No. 4 (66–72 mc.). And when capacitor 20 is so adjusted that the antenna system is resonant to the center frequency of Channel No. 13 (213 mc.) which is at the upper end of the high band, the antenna system is also resonant to a frequency in the vicinity of low-band Channel No. 5 (76–82 mc.). In other words, a wider range of capacitance values is required to tune the antenna system over the low band of television frequencies than over the high band. This is due to the fact that at the frequencies of the low band the effective tuner reactance is inductive, while at the high-band frequencies the effective tuner reactance is capacitive.

Figures 9, 10:
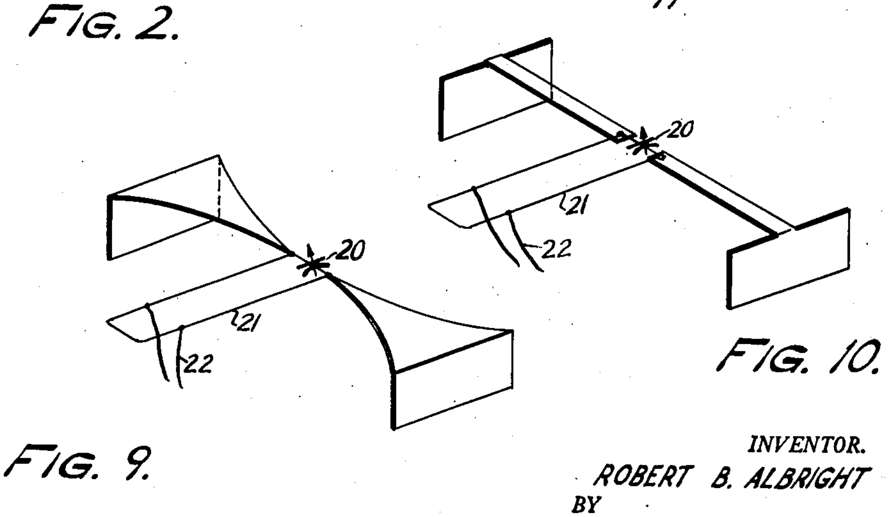
Figures 9 and 10 are views illustrating, in perspective, some of the alternative forms which the dipole may taken in accordance with the present invention.

In Figures 9 and 10 I have shown two of the alternate embodiments which the dipole may take, in accordance with the present invention. Other wide-band antennas, not illustrated, may also be employed. The reactance, radiation resistance, and equivalent shunt resistance characteristics of such other antennas, including the forms shown in Figures 9 and 10 will, of course, differ somewhat from those of a dipole having the form shown in Figure 1 and hereinabove described. However, by connecting the antenna substantially directly to a parallel-resonant turner circuit of proper circuit constants (by way of series reactance of selected value, if any be required), an antenna system may be provided which is tunable, selectively and individually, to the frequency of each of the currently-assigned television channels. It is to be noted that, in comparison with the arrangement illustrated in Figure 1, the dipole forms shown in Figures 9 and 10 have relatively long, narrow sections adjacent the terminals thereof. The dipoles of Figures 9 and 10 accordingly exhibit increased series inductance. With these dipoles, the insertion of additional series inductance is, therefore, frequently unnecessary and the parallel-resonant tuner circuit may be connected directly to the dipole terminals.

It may be helpful at this point to mention some of the more important considerations which control the selection of the circuit constants. In the first place, if the equivalent shunt resistance of the dipole is not approximately equal over the low- and high-band television channels, series reactance should be added. This, however, will not be necessary in all cases. Secondly, the variable shunt element in the tuner circuit should have a sufficiently wide range to permit the reactance of the tuner circuit to be adjusted to be substantially equal and opposite to the reactance of the dipole (and series-inductance elements, if any) at the center-frequency of each of the channels to be received. The variable shunt element is preferably the capacitor, but may be the inductor, or both. Where series reactance is employed, the variable element may be the series-reactance element. Thirdly, the Q of the antenna system should be sufficiently low to provide the desired bandwidth (at present approximately six megacycles) on each of the channels to which the antenna system is required to be tunable. Fourthly, the impedance of the antenna system should be matched, as nearly as possible, to the impedance of the transmission line (which connects the antenna system to the television-receiver input circuits) over the entire range of frequencies at which the antenna system is expected to operate.

The antenna system of the present invention, when constructed in accordance with the principles set forth, meets the foregoing requirements.

It will be clear from what has been said that the present invention contemplates the provision of a wide-band antenna having reactance of substantial magnitude at the frequencies desired to be received, together with electrical tuning means positioned at the antenna itself, that is, connected between the antenna and the transmission lines leading to the receiver, for introducing, at the particular frequency to be received, reactance of substantially equal magnitude but opposite polarity to that of the antenna at that frequency.

Having described my invention, I claim:

1. An antenna system for receiving signals in two separated bands of frequencies, said system comprising: a wide-band half-wave dipole antenna having a pair of arms resonant at a frequency substantially midway between said two bands, said dipole antenna having wide-band characteristics throughout a range of frequencies which includes the frequencies of said two bands and having the characteristics of a circuit having resistance, inductance and capacitance serially connected; and a tunable parallel-resonant circuit comprising a variable capacitor and a loop inductor, the junction terminals of said capacitor and inductor being connected directly to the terminals of said dipole antenna, said variable capacitor being adjustable to tune said parallel-resonant circuit to cancel out the reactance of said dipole antenna at each of two separated frequencies, at least one of which is in one of said bands.

2. Apparatus as claimed in claim 1 characterized by the fact that each of said arms is comprised of conductive material of substantially triangular configuration and a lumped inductance connected between the inner apex of the triangular member and the terminal of the arm.

ROBERT B. ALBRIGHT.

References Cited in the file of this patent

UNITED STATES PATENTS

| Number | Name | Date |
|---|---|---|
| 1,870,702 | Zworykin | Aug. 9, 1932 |
| 2,074,896 | Earnshaw | Mar. 23, 1937 |
| 2,197,494 | Erben | Apr. 16, 1940 |
| 2,293,112 | Carlson et al. | Aug. 18, 1942 |
| 2,313,046 | Bruce | Mar. 9, 1943 |
| 2,430,353 | Masters | Nov. 4, 1947 |
| 2,438,116 | Dodds | Mar. 23, 1948 |
| 2,512,704 | Willoughby | June 27, 1950 |